United States Patent [19]

Easley et al.

[11] 4,247,501
[45] Jan. 27, 1981

[54] MARBLEIZATION OF PLASTIC MATERIALS

[75] Inventors: Wiley L. Easley, Lancaster; Richard J. Hoeske, Leominister; Silvio Petrucci, Fitchburg, all of Mass.

[73] Assignee: Gillette Company, Boston, Mass.

[21] Appl. No.: 957,759

[22] Filed: Nov. 6, 1978

Related U.S. Application Data

[62] Division of Ser. No. 660,006, Feb. 23, 1976, abandoned.

[51] Int. Cl.³ .............................................. B29F 3/12
[52] U.S. Cl. ..................................... 264/77; 264/211; 264/328.2; 366/76; 425/207
[58] Field of Search .................... 264/73, 75, 77, 211, 264/349, 329, 328; 425/207; 366/76-78

[56] References Cited

U.S. PATENT DOCUMENTS

| | | | |
|---|---|---|---|
| 3,291,883 | 12/1966 | Cornelius et al. | 264/73 |
| 3,461,498 | 8/1969 | Ramaika | 264/211 |
| 3,664,790 | 5/1972 | Hollander | 425/207 |
| 3,817,675 | 6/1974 | Maiocco | 264/211 |
| 3,832,431 | 8/1974 | Matthaei | 264/211 |
| 4,125,582 | 11/1978 | Langlois | 264/75 |

*Primary Examiner*—Jeffery R. Thurlow
*Attorney, Agent, or Firm*—George E. Kersey

[57] ABSTRACT

Methods and apparatus for marbleizing molded parts produced by screw extruder machines. Liquid colorant is advantageously injected at a comparatively high pressure into a melt containing portion of the machine between the screw and its housing, where the melt is either completely molten or more than fifty percent molten.

7 Claims, 6 Drawing Figures

MARBLEIZATION OF PLASTIC MATERIALS

BACKGROUND

This is a divisional of Ser. No. 660,006 filed Feb. 23, 1976, now abandoned relating to the marbleization of materials and more particularly, to the marbleization of materials extruded from injection machines of the screw type.

Marbleization is often desired in molded parts for esthetic reasons. The marbleization is in the form of irregular streaks and striations, of varying intensity and color, in the finished article.

In the case of molded articles the desired marbleization has been achieved by using injection machines of the plunger type. Colorant pellets are added to the regular feed pellets at the feed hopper of the machine. After being melted, the colorant and feed materials are driven by a plunger into an associated mold. Since there is little or no mixing in a plunger machine, the colorant and feed materials tend to remain separate. This separation is carried into the mold and the desired marbleization is easily achieved.

By contrast, in an injection machine of the screw type, the addition of colorant pellets to the regular feed pellets merely modifies the colorant of the output product, as illustrated by U.S. Pat. No. 3,854,630 which issued Dec. 17, 1974. The reason is that there is invariable mixing in screw machines and the output melt is relatively homogeneous.

As a result, successful commercial marbleization of molded products has been achieved only with plunger machines. The latter, however do not produce uniform marbleization and cannot be used with unbalanced molds. In addition, they are slower and less efficient then screw machines. As a result, a number of attempts have been made to produce marbleized products with screw machines.

One such attempt was disclosed in U.S. Pat. No. 3,817,675 which issued June 18, 1974. In this patent a colorant hopper is positioned to apply feed pellets at the melt interface between a special "adiabatic" screw and a mixer. It is apparant that the provision of mixing stages beyond the place of introduction of colorant materials tends to mix the colorant with the base material. Moreover, although it is contended that a mottled or marbleized effect can be achieved, it is acknowledged that this requires minimization of the number of mixing stages.

Attempts also have been made to achieve the desired marbleization by injecting colorants into the nozzle cavities of screw machines. The nozzle pressures are so great that injection of the colorant is difficult. In addition, when the colorant does manage to enter the nozzle cavity it produces a void that causes undesirable delamination in the molded parts.

Accordingly, it is an object of the invention to enhance the efficiency and rate of marbleization of molded parts. A related object is to achieve marbleization with injection machines of the screw type.

Another object is to eliminate the need for reliance on plunger machines and special screw machines to achieve marbleization. A related object is to avoid the requirement for using a adiabatic screw. Another related object is to achieve marbleization with standard screw injection machines.

Still another object is to achieve marbleization in both balanced and unbalanced molds. A further object is to achieve relatively uniform marbleization in both balanced and unbalanced molds.

SUMMARY OF THE INVENTION

In accomplishing the foregoing and related objects, the invention provides for injecting a liquid colorant into the melt of a screw injection machine between the screw and its housing to achieve controlled marbleization of machine molded parts.

In accordance with one aspect of the invention, the injection is made into any region of the machine where the feed is either completely molten, or substantially, i.e., more than fifty percent, molten with the degree of striation being governed by the location of the colorant injection.

The striations became wider to the extent that the injection of colorant takes place as close to the output end of the machine as possible, as long as the injection is into a region where the screw is positioned opposite the point of injection.

In accordance with another aspect of the invention, the injection of colorant into the melt is made at a comparatively high pressure which is advantageously at least three times as great as the maximum melt pressure between the screw and its housing. The injection takes place through one or more injector fittings mounted in the housing of the machine. The use of a plurality of injectors permits the realization of multicolor marbleization.

In accordance with a further aspect of the invention, the injection is made of liquid colorant which has substantially the same relative viscosity as the melt, with the colorant advantageously having a relative viscosity which is in the range from about sixty to eighty percent greater than that of the melt, and the injector orifices have a diameter in the range from about 0.018 inch to about 0.025 inch.

In accordance with a yet further aspect of the invention the injection capacity per injection stroke is in the range from about 0.001 inch$^3$ to about 0.008 inch$^3$, and the injection pressure is over about 3000 lbs. per square inch, preferably over about 3600 lbs. per square inch.

In accordance with still another aspect of the invention, the injection screw is of the reciprocating type, with the injector unit advantageously positioned in the vicinity of the non-return valve near the output end of the machine when maximum width streaking is desired of the marbleized part. The injection can be made while the reciprocating screw is at rest; in its most forward position; in its most rearward position; during reciprocation; and during injection.

In accordance with yet another aspect of the invention, the colorant injection can be made into a wide variety of thermoplastic melts including, for example, polystyrene and nylon.

DESCRIPTION OF THE DRAWINGS

Other aspects of the invention will become apparent after considering several illustrative embodiments, taken in conjunction with the drawings, in which.

DETAILED DESCRIPTION

Figure 1A:
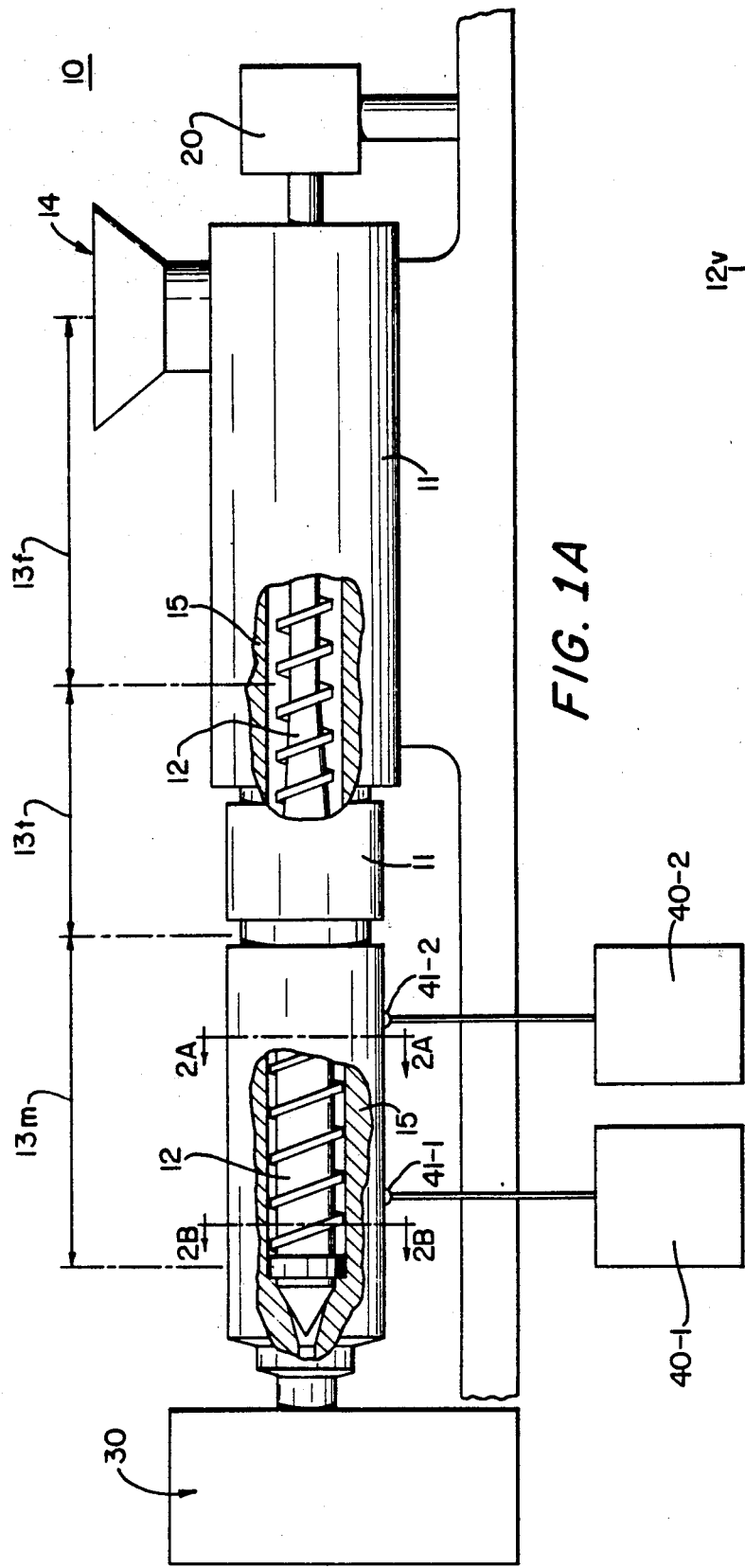
FIG. 1A is a schematic diagram of a screw injection molding machine, which has been modified in accordance with the invention.

Turning to the drawings, a screw injection molding machine 10, which has been modified in accordance with the invention is shown in FIG. 1A.

The machine 10 has a longitudinal barrel 11, shown partially in section, in which an extrusion screw 12 is mounted for operation by a motor 20. Where the screw 12 is of the reciprocating type, the motor 20 provides rotation within the barrel 11 and the action of the screw against the melt provides reciprocation along the axis of the barrel.

The screw 12 is of the standard type employed in injection molding and includes a feed section 13$f$, a transition section 13$t$ and a metering section 13$m$.

Feed for the machine is in the form of pellets placed in a hopper 14 in the feed section 13$f$. In this portion of the machine the screw 12 has a comparatively small root diameter and conveys the pellets in the direction of the screw rotation towards the transition section 13$t$. Because of the shear forces exerted against the pellets, they begin to melt during the course of their travel.

In the transition section 13$t$, the root diameter of the screw gradually increases towards the metering section 13$m$. This is because an increasing percentage of the feed becomes molten and a shallower depth of the screw thread will suffice.

By the time the feed reaches the end of the transition section 13$t$, it is substantially molten. It then enters the metering section 13$m$, which has a relatively shallow depth of screw thread, to permit a suitable build up of pressure to take place.

The output end of the machine is coupled to a mold 30, into which molten plastic material is injected to produce the desired product.

It will be understood that the machine 10 includes heating coils to maintain the fluidity of the melt in the metering section in accordance with conventional practice, as well as other standard accessories. An illustrative injection molding machine is the New Britain Model 175 manufactured by the New Britain Machine Works of New Britain, Connecticut.

In accordance with the invention, and as indicated in FIG. 1, the metering section includes dye injector fittings 41-1 and 41-2, which are operated from injector units 40-1 and 40-2. It is the operation of the injector units and the fittings that achieves the desired marbleization of plastic parts being formed in the mold 30.

The number of injectors depends upon the number of different color effects desired. In the embodiment of FIG. 1A, a two-color marbleization of the base material is realized, with a different color variation provided by each of the injectors 41-1 and 41-2.

In further accordance with the invention, the injection of the dye takes place in a completely or substantially molten portion of the feed material between the screw 12 and its housing 15. Consequently, the injection may be made in any location of the barrel 11 where the screw is present and the feed is substantially molten. Thus the injector 41-1 is located in the metering section where the feed typically is completely molten while the injector 41-2 is located where the feed is typically over about ninety-eight percent molten. The feed in the metering section 13$m$ typically becomes completely molten about three-quarters of its axial distance from the transition section 13$t$. In addition, it has been discovered that injection can be made in qualifying portions of the transition section 13$t$, even though the pressure characteristics in the transition section are entirely different than in the metering section, but it cannot be made where the feed material is not substantially, i.e. less than fifty percent, molten, or where the screw is absent, for example, at the output reservoir beyond the end of the screw.

The precise location of the injectors 41 along the axis of the barrel depends upon the extent to which the marbleization is desired to show some color mixing. In the forward position of injector 41-1, near the output end of the barrel 11, there is no appreciable color mixing and the striations of the marbleization are of maximum width. In the down feed position of the second injector 41-2, there is a tendency for more mixing to take place before the dye reaches the extruder nozzle, and the striations of the marbleization tend to have lesser width.

Figure 1B:
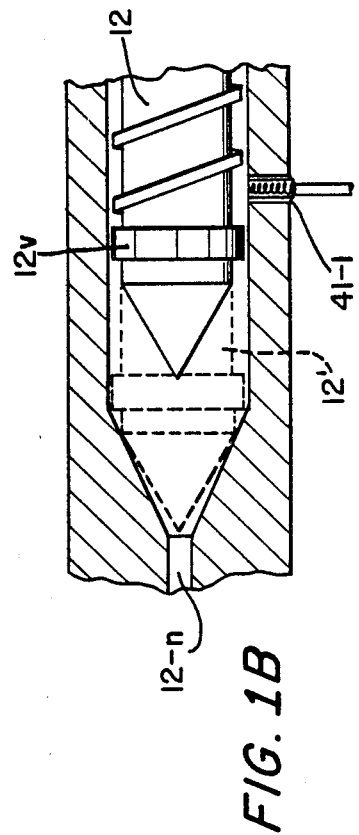
FIG. 1B is a fragmentary cross sectional view of the machine of FIG. 1A.

In any event, the injection cannot take place where the screw is not present. Thus, as indicated in FIG. 1B, the most forward position of an injector is at the location of the first injector 41-1, which for a reciprocating screw of the kind illustrated, is just beyond the most rearwards position of the shut-off 12$v$. In conventional operation of a reciprocating screw, it moves between the phantom position 12' and the retracted position 12. Of course, if dye injection is desired only with the screw completely forward, the first injector 41-1 can be moved, correspondingly, to a more forward position. In any event, the injection cannot take place in the nozzle cavity 12$n$, because it not only fails to achieve the desired marbleization, but is also has an adverse effect on the parts being molded.

In accordance with another inventive aspect, the colorant is injected at a comparatively high pressure relative to the maximum pressure between the screw and the housing. In general, the colorant injection should be at least about, and desirably above, three times the maximum internal pressure. Thus where the maximum internal pressure is 1,000 psi (between the transition and metering sections) the colorant injection pressure should be above 3,000 psi., notwithstanding that injection can bemade at a much lower pressure, particularly in the metering section where the internal pressure is typically on the order of 200 psi. However, it has been found that high rate, relatively uniform marbleization requires comparatively high colorant pressures.

Figure 2A:
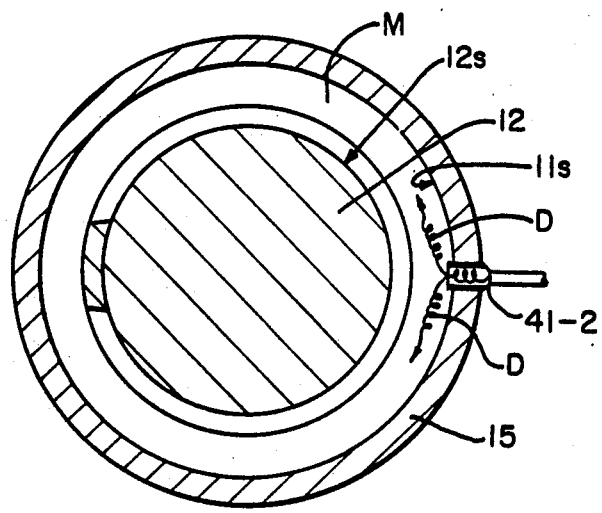
FIGS. 2A and 2B are cross sectional views of the barrel of the machines of FIG. 1A.
Figure 2B:
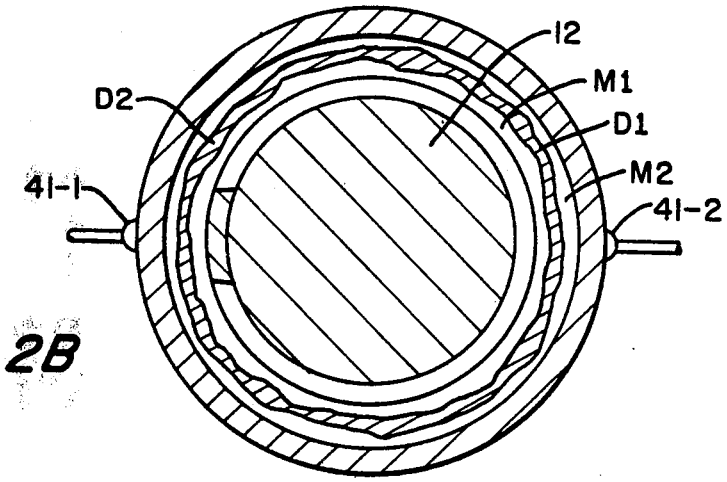

The effect of dye injection in accordance with the invention is illustrated in FIGS. 2A and 2B.

It is believed that when the dye D is injected into the melt M under high pressure it is repelled by heat from both the screw surface 12S and the barrel surface 11S and reaches equilibrium at an intermediate level between the two surfaces.

Injection samples taken from apparatus used in practicing the invention have indicated that the dye tends to form a ring as shown in FIG. 3B, with the band of the ring being most dense near the point of injection of the dye. In FIG. 2B the injection is of two different colors, on opposite sides of the barrel, and the bands from the colors tend to form a complete ring.

It appears that the ring formation in FIG. 2B accounts for the fact that marbleization in accordance with the invention can be achieved regardless of whether the mold 30 is balanced or unbalanced.

Figure 2C:
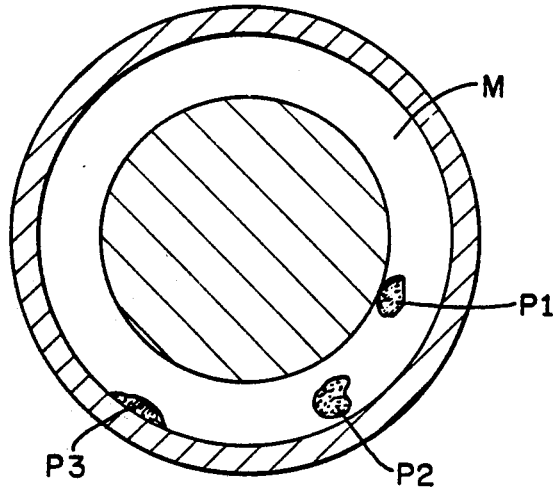
FIG. 2C is a cross sectional view of a barrel of an alternative machine.

In a balanced mold, the distance that the melt travels from the nozzle is the same for each cavity. The opposite situation exists in an unbalanced mold. When the prior art plunger technique is used to achieve marbleization, it is necessary for the mold to be balanced if the marbleization is to be relatively uniform. The reason is indicated by FIG. 2C, which shows that the colorant is in random pockets P1 through P3. Unless the mold is completely balanced there will be asymmetry in the distribution of pigment. This is by contrast with the invention as illustrated in FIG. 2B. Because the pigment tends to form rings, there will be little or no asymmetry in the distribution of molten material in the mold cavities.

Figure 3:
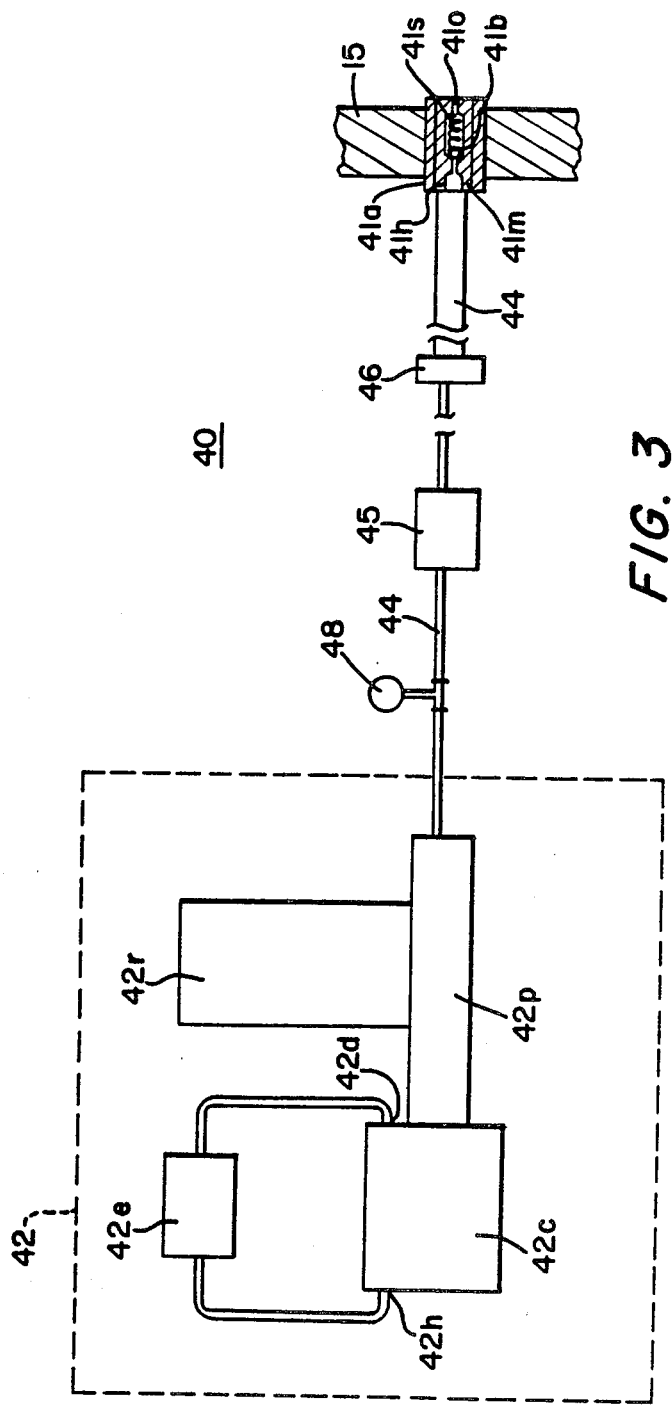
FIG. 3 is a schematic diagram of the injector units and fittings used in accordance with the invention.

A block diagram of an illustrative injector machine 40 for practicing the invention is shown in FIG. 3.

The injector mechanism 40 is formed by a pump 42 that forces dye from a reservoir 42r over a feed line 44, through a check valve 45 to a volume control unit 46 to an injector 41. The pump 42 includes a plunger 42p which is operated by a cylinder 42c that acts in conjunction with a solenoid operated valve 42e.

The guage 48 in the line 44 gives an indication of the injection pressure. The dye material is a liquid pigment with a viscosity similar to that of the melt.

The cylinder 42c and the plunger 42p operate in conventional fashion. As air fluid from the valve 42e is forced into the head inlet 42h of the cylinder 42c, the plunger 42p forces dye along the line 44. Conversely, as air fluid is forced into the rod inlet 42d of the cylinder 42c, the plunger 42p is retracted Suitable apparatus for operating the injectors 41-1 and 41-2 is the model 82653 or the Model 82716 CENTRO-MATIC units manufactured by the Lincoln Company of St. Louis, Missouri.

As shown in FIG. 3, the injector is a high pressure metering unit 41m imbedded in an adapter 41a. The metering unit 41m includes a housing 41h and a check ball 41b that is loaded by a spring 41s. The housing 41h is pressed into the adapter 41a which has an outlet orifice 41o that is properly proportioned to achieve the desired injections.

In a tested embodiment of the invention using fluids and a melt having a viscosity between about SAE 80 or 90, the outlet orifice had a diameter ranging between 0.018 inch and 0.025 inch.

It has been discovered experimentally that under these conditions an orifice less than about 0.018 inch produces clogging and that an orifice greater than about 0.025 inch permitted feedback of the melt. A typical test orifice had a diameter of about 0.023 inch.

The volume control unit 46 controls the volume of injection per stroke of the pump unit 42. The volume of dye injected per stroke can range between 0.001 to 0.008 cubic inches. An injection of 0.008 cubic inch per stroke is suitable for light color pigment, while 0.001 cubic inch per stroke is suitable for dark pigment.

A volume control unit provides 0.001 cubic inch per stroke is the Series SL-1 of the Lincoln Manufacturing Company of St. Louis. The Lincoln Series SL-32 provides 0.008 cubic inches per stroke.

For screw extruders of conventional type, an injection pressure of about 3600 psi has been found adequate to achieve suitable injection in accordance with FIGS. 2A and 2B.

The invention is further illustrated by the following non-limiting examples:

EXAMPLE I

White pellets are fed into the hopper 14 of FIG. 1. If no colorant is added, the molded product will be white. Black dye is applied in a single shot to injector 41-1 which has a capacity of 0.001 cubic inch per shot, during the forward stroke of a reciprocating screw extruder. Green dye is applied in a single shot to the second injector 41-2, which has a capacity of 0.008 cubic inch per shot, during rotation of the reciprocating screw. After rotation of the screw ceases, another shot of black dye is injected at the forward injector 41-1. The foregoing procedure is repeated during each cycle of the reciprocating screw. The result is a deep green marbleization of the molded part. In addition, the marbleization pattern is similar from part to part.

EXAMPLE II

White colored pellets are fed into the hopper 14 of FIG. 1. Black dye is injected through injector 41-1 during each cycle of a reciprocating screw, with one shot when the screw is in its forward position and one shot at the end of the screw rotation. The amount injected on each shot is about 0.001 cubic inch. The result is a black marbleization of the molded parts.

EXAMPLE III:

White colored pellets are fed into the hopper 41 of FIG. 1. Red dye is applied through the forward injector 41-1, which provides 0.008 cubic inch per shot. Blue dye is applied through the rearward injector 41-2 which provides 0.001 cubic inch per shot. After a reciprocating screw has traveled about 3/16 inch, both color injectors are operated. They are operated again with the reciprocating screw in its most rearward position. The result is a blue-red marbleization of the molded product.

It will be apparent that the dye may be injected during any of a number of different operating conditions in a reciprocating screw machine. When the screw is in its forward position, injection can be made of one or more colors. As the screw begins to return to its initial position, optional injection can be made of one or more colors while the screw is swirling. When the screw is at rest and the nozzle chamber is being loaded, injection can again be made of one or more colors. Subsequently, as the screw begins to go forward, injection again can be made of one or more colors. Time of injection determines the position of the color effect on the molded object and is determined experimentally.

While various aspects of the invention have been illustrated by the foregoing detailed embodiments, it will be understood that various substitutions of equivalents may be made without departing from the spirit and scope of the invention as set forth in the appended claims.

What is claimed is:

1. The method of marbleizing the melt of a screw injection machine, which comprises the steps of:
    (a) preparing a liquid colorant of at least sixty percent higher viscosity than the melt; and
    (b) injecting the liquid colorant into a melt which is at least fifty percent molten at a pressure at least about three tims as great as the pressure of the melt at the point of injection; thereby to create a band of colorant within the melt at an intermediate level thereof.

2. The method of claim 1 wherein the injection pressure is above about 3,000 pounds per square inch.

3. The method of claim 2 wherein the injection pressure is about 3,600 pounds per square inch.

4. The method of claim 1 wherein said liquid coloring is injected through a fitting having an outlet orifice with a diameter in the range from about 0.018 inch to about 0.025 inch.

5. The method of claim 1 wherein said liquid colorang injected through a fitting having an injection capacity in the range from about 0.001 cubic inch to about 0.008 cubic inch per injection stroke.

6. The method of claim 1 wherein said relative viscosity of said colorant is in the range from about 60 percent to about 80 percent greater than that of said melt.

7. The method of claim 1 wherein the screw reciprocates and the colorant is injected while said screw is in at least one of the following positions:
   a. The reciprocating screw is in its most forward position.
   b. The reciprocating screw is injecting;
   c. The reciprocating screw is in its most rearward position; and
   d. The reciprocating screw is reciprocating.

* * * * *